2,952,596
ACTIVATION OF METALS FOR GRIGNARD TYPE SYNTHESES

Paul N. Rylander, Newark, N.J., and Thomas D. Nevitt, Valparaiso, Ind., assignors to Standard Oil Company, Chicago, Ill., a corporation of Indiana No Drawing. Filed Apr. 11, 1957, Ser. No. 652,104

3 Claims. (Cl. 204—154)

This invention relates to a new and improved process for the preparation of organometallic compounds. This invention relates particularly to the preparation of organometallic halides, and is especially concerned with the preparation of magnesium compounds such as the organomagnesium halides which find wide application in the synthesis of organic compounds, for example, via the Grignard reaction.

There are numerous types of organometallic compounds, which as a class may be characterized by the fact that they contain a metal linked directly to a carbon atom of a hydrocarbon radical. The organometallic compounds may be further classified as either "simple" or complex." By a "simple" organometallic compound is meant one which has only hydrocarbon radicals attached to the metal, whereas "mixed" oganometallics have both metal to carbon bonds and metal to non-carbon element bonds, for example, metal to halogen, hydroxyl, amino and the like. The hydrocarbon radical of an organometallic compound may be aliphatic, alicyclic, aromatic or heterocyclic, but should not contain substituents which react with organometallic compounds, while the non-hydrocarbon group of a mixed organometallic is likewise limited to those groups which will not react with organometallic bonds.

Organometallic compounds in which the metal atom is magnesium have been designated as Grignard reagents. These compounds comprise the mixed organometallics of magnesium and may be generally represented by the formula RMgX wherein R is an organic radical and X usually represents a halogen atom. The Grignard synthesis depends on the preparation of the Grignard reagent which may then be utilized for reaction with a wide variety of compounds in anhydrous solvents for the preparation of hydrocarbons, olefins, alcohols, ketones, carboxylic acids and the like. The Grignard compounds are particularly useful for the preparation of organometallic compounds of other metals. The scope and importance of the Grignard synthesis as a preparative method in organic chemistry may be realized by reference to the recently published, "Grignard Reactions of Non-Metallic Substances," by M. S. Kharasch and Otto Reinmuth (Prentice-Hall, Inc., 1954).

In the synthesis of organometallic compounds, the reaction of the metal with, for example, an organic halide is characterized by what has been called an "induction period." That is, mere addition of the organic halide in a suitable anhydrous solvent, e.g. diethyl ether, dibutyl ether and the like, to the elemental metal does not result in immediate reaction, and this is generally true even though the metal is in finely divided or activated form. Various theories have been propounded to explain the reluctance of the metal to react with the organic compound, and a variety of methods have been proposed to overcome the difficulty in initiating the reaction. Thus, use of extremely pure metals has been tried, as well as a variety of metal alloys containing small amounts of activating metals. Other investigators have proposed the use of halogen in elemental form, or addition of alkyl halides which are known to readily undergo reaction with metals, e.g. lower alkyl bromides, or addition of a preformed organometallic compound itself. While much effort has gone into study of suitable means of initiating such reactions, no entirely satisfactory method has as yet been found. The problem is particularly acute when commercial quantities of organometallic compounds are prepared in such highly flammable solvents as diethyl ether, where delay in initiating reaction often results in a highly exothermic and dangerous reactions when the reactants finally do react.

It is an object of this invention to provide an improved process for the preparation of organometallic compounds. It is a further object of this invention to provide a new and improved means for initiating the reaction of a metallic element with an organic compound for preparation of an oragnometallic compound. It is a particular object of this invention to provide a new and effective means for initiating the reaction of magnesium with organic halides for the preparation of the Grignard reagent. Another object of our invention is to provide a means for activating metal elements which are to be used in the preparation of organometallic compounds, particularly by reaction with hydrocarbon halides.

The reaction between a halide and a metal is influenced both by the reactivity of the halogen in RX and by the reactivity of the metal. Many of the metallic elements undergo reaction with organic halides, e.g. the elements Mg, Zn, Al, Ga, Ir, Tl, Pb, Sn. While our invention will be particularly described with reference to the preparation of organometallic compounds of Mg, that is, Grignard reagents, it should be clear that our invention is equally applicable to the preparation of organic compounds of any metal which reacts with organic halides and which reaction is characterized by the above described induction period.

We have now discovered that metallic elements which are to be used as reactants for the preparation of organometallic compounds may be activated by exposure to high energy radiation, e.g. by bombardment with ionizing radiation such as X-rays, alpha rays, protons, neutrons, gamma rays or beta particles. We have further discovered that the reaction of a metallic element with an organic halide may be promoted by in situ exposure of the reactants under suitable reaction conditions with high energy ionizing radiation. Such exposure of the metal alone or of the reactant mixture results in a pronounced reduction or even elimination of the induction period characteristic of the reaction of metals with organic halides, resulting in rapid initiations reaction and avoiding the danger of runaway reactions occurring with explosive violence.

The Grignard synthesis and the preparation of Grignard compounds is ordinarily conducted in the presence of an anhydrous solvent, preferably a lower ether such as diethyl ether or dibutyl ether. The various steps and conditions for conducting the synthesis are well known and have been thoroughly described in organic chemistry texts and in the literature. In accordance with the present invention, there has been discovered a method for initiating the Grignard reaction by subjecting the metallic element alone, or in the presence of a solution of organic halide reactant, to the influence of ionizing radiation. While it is not the purpose of this invention to propose a theory to explain the ability of ionizing radiation to overcome the reluctance of the metal to enter into reaction, and this invention is not to be limited by any such theory, it has been known that Grignard reaction can sometime be started by scratching the magnesium with a glass rod. The theory behind this is that a clean, mechanically created surface of metallic magnesium includes many points of unsaturation which may be regarded as centers of exceptional activity. Points of unsaturation are actual free valences and result from lattice distortions in elongated or otherwise strained intermetallic bonds.

Although not wishing to be restricted to any theory, it seems that subjecting magnesium or other metals to irradiation with highly energetic particles, such as neutrons, protons, beta-rays and the like, may cause formation af active centers on the metallic surface. While only a few such active centers may be formed during irradiation, only a very few are required to get the reaction started and to overcome the initial induction period characteristic of such reactions.

The metallic element may be irradiated prior to use for the preparation of the Grignard reagent, or the reactants may be combined in a suitable solvent under Grignard forming conditions and then subjected to irradiation to initiate reaction. Where the latter method is employed, the activation may be due to attack of the metal by free radicals formed in solution.

Where the metal is first activated by exposure to penetrating radiation, the irradiation may be conducted with neutrons, protons, gamma rays, alpha particles, beta rays and the like, having sufficient energy to cause formation of relatively active centers on the metallic surface. Neutron bombardment has been found to be particularly effective and especially advantageous results may be obtained by exposing the metal to irradiation generated by a neutronic reactor. Fast neutron or slow neutron reactors may be used for this purpose; one reactor in which such irradiation may be conducted is described in United States Patent 2,708,656 issued to Enrico Fermi and Leo Szilard.

The radiation generated within such a neutronic reactor includes both fast and slow neutrons, beta and gamma radiation. Where a neutron moderator is used in the reactor, the energies of the neutrons will vary from several million electron volts to thermal energies (about 0.03 E.V.). Where little or no moderator is used, the energy of the neutrons may be largely above 100,000 E.V. In any case, matter inserted in a neutronic reactor of the type referred to above will be exposed to intense radiation of neutrons having energies from about 1000 to about 100,000 E.V. as well as thermal or slow neutrons, gamma rays and beta irradiation.

The metals which are to be activated for preparation of the Grignard reagent may be placed in the path of the energetic beam by insertion into a well within the reactor. Where irradiation with neutrons alone is desired, the beam may be directed to a point outside of the neutronic reactor, and the metal irradiated with a minimum exposure to gamma or beta irradiation. Depending upon the neutron flux to which the metal is exposed, periods of from 15 minutes up to several days or even longer will activate the metal for the purpose herein described and a neutron flux of from about $10^{11}$ to about $5 \times 10^{13}$ n/cm.$^2$ sec. will be effective.

Alternative sources of neutron irradiation may be used with equally effective results. For example, deuterons may be accelerated in an electrostatic machine such as a Van de Graaff or linear accelerator and caused to impinge on a metal target of beryllium. The resulting neutron beam may be caused to impinge on the metal, e.g. magnesium, which is to be activated for reaction with organic halides and the like. Other nuclear particles or rays may be similarly accelerated, and other targets such as lithium or hydrogen may be employed.

Activation of the metal to be used in organometallic compound formation may be effected by means of other high energy radiation, e.g. alpha rays, beta rays or electrons, protons or gamma radiation. Beams suitable for treatment of the metal may be produced by electrostatic generators such as the Van de Graaff generator to accelerate protons or other positive ions to energies of 2–6 mev. as is well known in the art, and commercial generators are available which supply beams of such high energy particles which may be readily utilized for the purpose herein described.

As has been noted, it is not necessary to subject the metal to high energy radiation prior to use in the Grignard or related organo-metallic synthesis. In the ordinary method of conducting the Grignard reaction, the metal in powdered, granulated form or in the form of turnings is introduced to a reaction vessel together with a quantity of anhydrous solvent, for example, a lower alkyl ether such as diethyl ether. To the stirred two phase system (solid-liquid) is then slowly added an ether solution of the organic halide reactant. It is customary to add only a small quantity of the halide reactant to the metallic component, and then to stir, scratch or heat the reactants to initiate reaction. Depending upon the activity of the metal and of the alkyl halide, reaction may begin with from several minutes, or may take as long as several hours or even days to commence.

By subjecting the reaction mixture containing the metal, ether solvent and small initiating quantities of organic halide to the action of ionizing radiation, it is possible to reduce or eliminate the induction period altogether, thus causing rapid initiation of the reaction, which then progresses in a normal manner. The reaction mixture prepared as above may be exposed to neutron or other irradiation by introduction into a neutron reactor or by means of well-known particles accelerating machines, or may be exposed to penetrative radiation derived from natural or synthetic radioactive sources. Such sources may be elements or mixtures of elements which emit beta or gamma radiation, for example the elements of the uranium, thorium or actinium series which, during spontaneous decay, emit penetrative radiation of value in the present invention. Other elements or compounds, which, though not naturally radioactive, may be activated by exposure to penetrative radiation, as by exposure in a neutron reactor may be used to produce suitable synthetic isotopes whose decay is accompanied by useful penetrative radiation. In the case of beta or gamma radiation, a total dose of from $10^5$–$10^8$ REP's has been found to be effective in initiating reaction, the dose rate (REP's/hr.) apparently having no significant effect on the reaction.

The following examples are presented as an illustration of the practice of the process of our invention.

Example I

Magnesium turnings (1 g.) were sealed in Vicor glass under an inert atmosphere (nitrogen) and the sealed glass tube introduced into the C.P. 5 research reactor maintained by the U.S. Atomic Energy Commission at the Argonne National Laboratory in Lemont, Illinois. This reactor utilizes enriched $U^{235}$ as fuel and heavy water as moderator and coolant, and is provided with experimental holes which penetrate the shields and reflectors of the reactor. The sample was exposed to a thermal neutron flux of $1.5 \times 10^{13}$ cm.$^2$ sec.$^{-1}$ for a period of 6 days. The glass became and remained radioactive, emitting beta radiation, while the magnesium did become, but did not remain, radioactive.

To each of four test tubes was added 5.0 ml. of anhydrous diethyl ether, 10 drops of methyl iodide and 0.10 g. of magnesium turnings. Two tubes contained magnesium irradiated as described, two contained untreated magnesium from the same source. The tubes were placed in a rack and the entire rack shaken gently a few times. The beginning of the reaction was taken as the time when the first cloudiness appeared in the solution.

| Test | Magnesium | Time To Initial Reaction, minutes |
|---|---|---|
| 1 | Untreated | 11 |
| 2 | Untreated | 12 |
| 3 | Irradiated | 3.5 |
| 4 | Irradiated | 4 |

Example II

In a second series of experiments there was charged to a series of test tubes 5.0 ml. of anhydrous diethyl ether, 0.10 g. of magnesium turning and 20 drops of cyclopentyl bromide. The tubes were kept in a beaker of water at 35° C.

| Test | Magnesium | Time To Initial Reaction, minutes |
|---|---|---|
| 5 | Untreated | 32 |
| 6 | Untreated | 38 |
| 7 | Irradiated | 9 |
| 8 | Irradiated | 11 |

The above tests show that the irradiated magnesium is definitely more reactive. The time till reaction started utilizing neutron activated magnesium was in each case from 1/3 to 1/4 that for untreated metal.

Example III

The promotional effect of ionizing radiation on the reaction of metals with organic halides is shown by this example.

In each of two test tubes was placed 5.0 ml. of anhydrous ether, 15 drops of methyl iodide and 0.1 g. of untreated magnesium turnings. In one test tube was placed a small amount (0.1 g.) of the Vicor glass capsule which had been exposed in the neutronic reaction and which was found to be a beta emitter. The reaction in the test tube containing the glass started immediately; the other required ten minutes.

A similar experiment was run with magnesium and bromobenzene which is generally a difficult reaction to start. In each of two test tubes was placed 5.0 ml. of anhydrous diethyl ether, 10 drops of bromobenzene 0.1 g. of unirradiated magnesium turnings. One test tube contained .1 g. of radioactive Vicor glass. The reaction in this test tube started in 30 minutes. The reaction in the other test tube had not begun to react even after 18 hours.

Example IV

In a similar experiment, ethyl iodide and 0.1 g. of aluminum turnings (10% brass) were charged to a test tube, and the test tube placed in the center of a number of stacked radioactive piston rings. The dose of gamma radiation received by the reactants was estimated at 300–800 REP/hr., and the test tube was exposed for 16 hours. At the end of this time, the ethyl iodide had become cloudy and the surface of the aluminum turnings had turned white, indicating that reaction had been initiated. No change was noted in an unirradiated blank.

Metals which have been activated for reaction with organic halides by irradiation as herein described are in a particularly reactive form, and therefore it is advisable to avoid contact with materials such as oxygen or water which will destroy the activity prior to contacting with the organic halide reactant. Best results are obtained by exposing the metals to irradiation under a blanket of helium or nitrogen, and by effecting transfer of the metal to the reaction medium without exposure to the atmosphere. Where the reactants are contacted in the presence of ionizing radiation, the ether solution may be deaerated by blowing with an inert gas, and for best results the reactor should be protected from contamination with moisture.

Activation of the metal is preferably conducted at ambient temperatures, but temperatures from about −50° C. to about 150° C. may be employed.

This invention is not to be limited to any theory of the reactions described herein, nor to any examples of the process or apparatus which are given solely for purpose of illustration.

Having described our invention, what we claim is:

1. In a process for preparing organo-metallic compounds by contacting an organic halide with a metallic element in a reaction zone under anhydrous conditions, the improvement which comprises effecting such contact with a metal activated prior to contacting with said organic halide by exposure to a neutron flux of between about $10^{11}$ and $5 \times 10^{13}$ n/cm.$^2$ sec. for at least 0.25 hour said neutrons having a minimum energy level of at least about 0.03 electron volt, said contacting being effected after essentially complete decay of any induced radioactivity in said metal.

2. The process of claim 1 wherein said metallic element is magnesium.

3. In a process for the preparation of a Grignard reagent of formula RMgX wherein magnesium metal in a form having a large surface area is contacted under anhydrous conditions with a solution of an organic halide of formula RX in a lower dialkyl ether solvent, the improvement which comprises activating the magnesium metal prior to contacting with said organic halide by exposure to a neutron flux of between about $10^{11}$ and $5 \times 10^{13}$ n/cm.$^2$ sec. for a period of from 1 to about 150 hours said neutrons having a minimum energy level of at least about 0.03 electron volt and effecting said contacting after essentially complete decay of any induced radio-activity in the magnesium.

References Cited in the file of this patent

UNITED STATES PATENTS 2,405,019    Dalin                July 30, 1946

OTHER REFERENCES

Malinovski et al.: Chem. Abstracts, vol. 49, p. 13788 (1955).

Bourne et al.: "Chemistry and Industry," p. 1374 (pub. in Australia on Dec. 12, 1955), Nov. 24, 1956.

Dienes, "Proceedings of the International Conference on the Peaceful Uses of Atomic Energy," vol. 7, pp. 634–640 (1956).

Huber et al.: "Chem. Abstracts" vol. 40, p. 5636(7) (1946).